United States Patent
Lovinggood et al.

(10) Patent No.: US 6,615,021 B1
(45) Date of Patent: Sep. 2, 2003

(54) METHOD AND APPARATUS FOR TRANSMITTING RADIO FREQUENCY SIGNALS TO AND FROM A PAGER

(75) Inventors: Breck W. Lovinggood, Garland, TX (US); William P. Kuiper, Lucas, TX (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 09/432,457

(22) Filed: Nov. 2, 1999

(51) Int. Cl.[7] ............................................. H04B 11/15
(52) U.S. Cl. ........................ 455/11.1; 455/15; 340/7.21
(58) Field of Search ........................... 455/11.1, 19, 20, 455/21, 22, 561, 550, 15, 16; 340/7.1, 7.21, 7.25

(56) References Cited

U.S. PATENT DOCUMENTS

| | | | |
|---|---|---|---|
| 4,041,389 A | | 8/1977 | Oades |
| 4,198,600 A | * | 4/1980 | Oguchi et al. ................. 455/15 |
| 4,284,848 A | | 8/1981 | Frost |
| 4,556,865 A | | 12/1985 | Fukagawa et al. |
| 4,599,598 A | | 7/1986 | Komoda et al. |
| 4,701,935 A | | 10/1987 | Namiki |
| 4,789,933 A | | 12/1988 | Chen et al. |
| 5,023,930 A | * | 6/1991 | Leslie ........................... 455/18 |
| 5,133,001 A | | 7/1992 | Böhm |
| 5,252,979 A | | 10/1993 | Nysen |
| 5,265,150 A | | 11/1993 | Helmkamp et al. |
| 5,321,736 A | | 6/1994 | Beasley |
| 5,408,681 A | * | 4/1995 | Ressler et al. ................. 455/20 |
| 5,424,859 A | | 6/1995 | Uehara et al. |
| 5,437,055 A | | 7/1995 | Wheatley, III |
| 5,537,637 A | | 7/1996 | Sugita et al. |
| 5,577,265 A | | 11/1996 | Wheatley, III |
| 5,752,163 A | * | 5/1998 | Robinson .................... 340/7.21 |
| 5,770,970 A | | 6/1998 | Ikeda et al. |
| 5,802,452 A | * | 9/1998 | Grandfield et al. ......... 370/315 |
| 5,809,398 A | * | 9/1998 | Moberg et al. ............... 455/22 |
| 5,812,933 A | | 9/1998 | Niki |
| 5,815,108 A | | 9/1998 | Terk |
| 5,832,364 A | | 11/1998 | Gustafson |
| 5,832,365 A | | 11/1998 | Chen et al. |
| 5,854,611 A | | 12/1998 | Gans et al. |
| 5,995,804 A | * | 11/1999 | Rootsey et al. ............. 455/11.1 |

FOREIGN PATENT DOCUMENTS

EP  0 674 452 A2 * 9/1995 ............ H04Q/7/22

* cited by examiner

*Primary Examiner*—Charles N. Appiah
(74) *Attorney, Agent, or Firm*—Wood, Herron, & Evans, LLP

(57) ABSTRACT

A repeater for transmitting and receiving radio frequency (RF) signals to and from a pager. The repeater includes a forward path for receiving a first RF signal from a base station and a reverse path for receiving a pager signal from a pager. The forward path includes a channelizer which down converts the first RF signal to an intermediate frequency (IF) signal, amplifies the IF signal, and up converts the IF signal to a second RF signal suitable for transmission to a pager. The reverse path includes a second amplifier which amplifies the pager signal to an amplified signal suitable for transmission to a base station antenna.

33 Claims, 3 Drawing Sheets

METHOD AND APPARATUS FOR TRANSMITTING RADIO FREQUENCY SIGNALS TO AND FROM A PAGER

FIELD OF THE INVENTION

The present invention relates generally to repeaters. More particularly, it concerns a method and apparatus for transmitting radio frequency signals to and from a pager.

BACKGROUND OF THE INVENTION

Repeater systems are typically used where the area to be covered and/or capacity requirements do not justify the installation of a full base station system with managed frequency-channel allocation. Thus, tower-mounted repeater systems are often used to extend the range of a base station and to fill nulls in the coverage area of the base station. Nulls are regions that are blocked from receiving radio frequency (RF) signals. Nulls are created by hills, trees, buildings, etc. blocking the RF signal.

The typical repeater system comprises three basic parts: the link antenna which is directed/aimed at a base station antenna; repeater electronics; and a broadcast antenna which is directed towards the area of interest. Often, the link antenna is highly directive (high gain) with a very narrow beamwidth because it only needs to "see" the base station antenna. The broadcast antenna has a larger beamwidth which is determined by the intended area to be covered. The repeater electronics may contain an assortment of diplexers, filters, splitters, and RF amplifiers.

Two primary performance factors on which an antenna system is based are gain and output power. The output power is mostly determined by the sum of the link and broadcast antenna gains and the maximum (linear) output power of the amplifier(s). The system gain is determined by the sum of the passive antenna gains, plus the gain of the amplifier(s). This is limited by the isolation (or mutual coupling) between the broadcast and link antennas. The isolation depends on the antenna type, front to back (F/B) ratio and beamwidth.

Repeater systems are used in a variety of applications such as TV and radio transmission, cellular/PCS communications, and pager services. Existing pager repeaters typically only provide one-way communication with a pager. For example, a base station antenna typically transmits a signal to a pager through one or more pager repeaters. This signal usually contains a phone number where the person calling the pager can be reached. Thus, traditional pager repeaters only provided for one-way communication with the pager and could not transmit signals to the base station (BS) antenna.

Recently, however, two-way pagers have been introduced that allow the pager to transmit signals (such as messages) to the BS antenna. Thus, to provide nationwide two-way pager coverage, additional full base station antennas would be required because traditionally only they had the capability to send and receive pager signals. However, full base station antennas are costly to construct and expensive to maintain. Therefore, to avoid the proliferation of costly full base station antennas, a pager repeater capable of two-way communication with a pager is desirable. The present invention is directed to addressing this need.

SUMMARY OF THE INVENTION

A repeater for transmitting and receiving radio frequency (RF) signals to and from a pager. The repeater includes a forward path for receiving a first RF signal from a base station and a reverse path for receiving a pager signal from a pager. The forward path includes a channelizer which down converts the first RF signal to an intermediate frequency (IF) signal, amplifies the IF signal, and up converts the IF signal to a second RF signal suitable for transmission to a pager. The reverse path includes a second amplifier which amplifies the pager signal to an amplified signal suitable for transmission to a base station antenna.

BRIEF DESCRIPTION OF THE DRAWINGS

Other objects and advantages of the invention will become apparent upon reading the following detailed description and upon reference to the accompanying drawings, in which.

Figure 1:
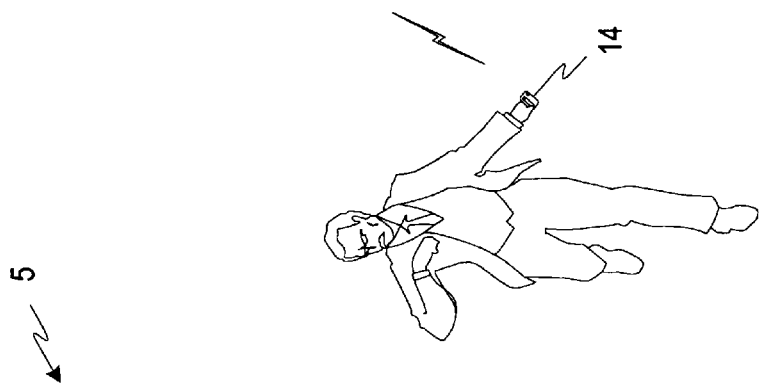
FIG. 1 is an antenna system for transmitting data to and receiving data from a two-way pager according to one embodiment of the invention.
Figure 1:
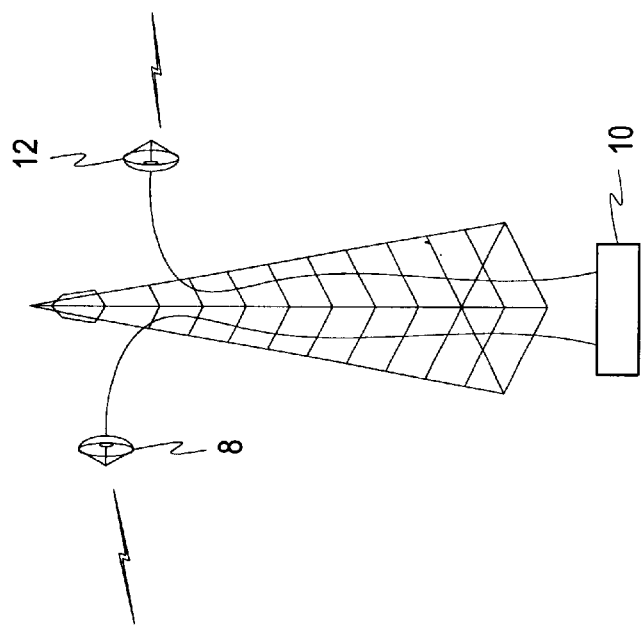
Figure 1:
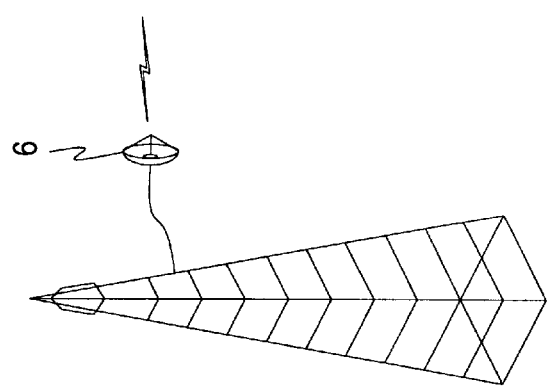

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Referring to FIG. 1, there is shown an antenna system 5 for transmitting data to and receiving data from a two-way pager 14. The antenna system 5 includes a base station antenna 6, a link antenna 8, a two-way repeater 10, a broadcast antenna 12 and the two-way pager 14. To communicate data between the base station (BS) antenna 6 and the two-way pager 14 requires the use of a device capable of two-way communication. Previously this device was a full base station antenna. The novel two-way repeater 10 eliminates the need for additional full base station antennas to extend the range of the originating base station antenna 6 and/or to fill nulls in the coverage area of the originating base station antenna 6.

Figure 2:
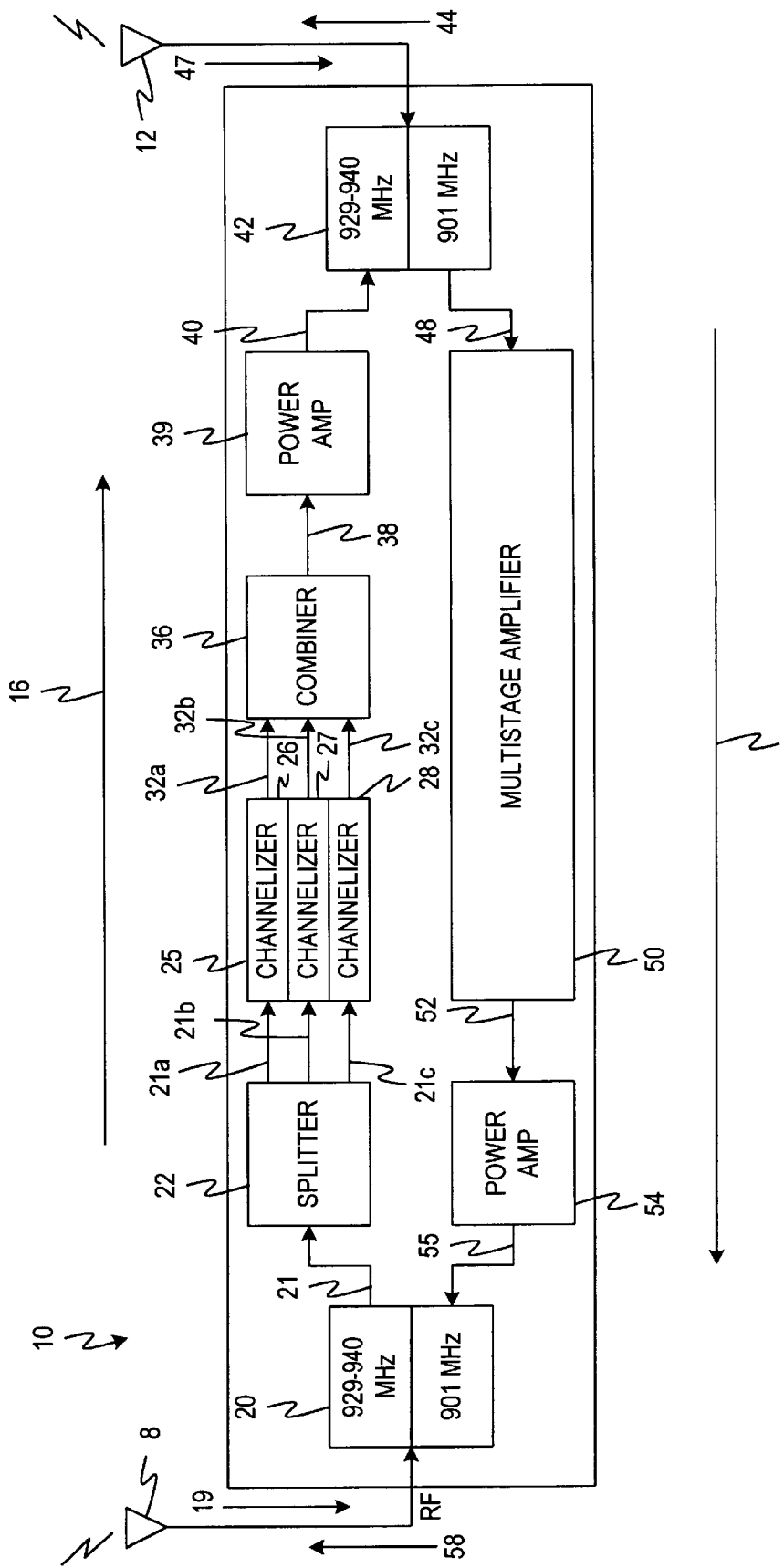
FIG. 2 is a schematic diagram of a two-way repeater for use in the antenna system.

The two-way repeater 10 transmits and receives RF signals to and from the pager 14. Thus, the repeater 10 operates in full duplex mode (i.e., operates in two directions simultaneously) using at least two separate frequencies, one for each direction. As shown in FIG. 2, the repeater 10 includes a forward path 16 from the BS antenna 6 to the pager 14 and a reverse path 18 from the pager 14 to the BS antenna 6. Thus, the repeater 10 provides two-way communication with one or more pagers 14. The forward path 16 includes a diplexer 20 connected between the input of the forward path 16 and the output of the reverse path 18. Similarly, a second diplexer 42 is connected between the output of the forward path 16 and the input of the reverse path 18. The diplexers 20, 42 are used to separate the power for each path 16, 18. RF signals 19 are received on the link antenna 8 and routed through the diplexer 20 and through the forward path 16. The second diplexer 42 then delivers filtered signals 44 to the broadcast antenna 12 which transmits the processed signals. In the reverse direction, the broadcast antenna 12 receives RF signals 47 which are fed through the second diplexer 42 and through the reverse path 18. The first diplexer 20 then delivers filtered signals 58 to the link antenna 8 which transmits the processed signals to the BS antenna 6.

The two-way repeater 10 can process multiple channels simultaneously in the forward path 16. Therefore, the RF signals 19 each contain one or more signals each at a different frequency (channel).

The diplexer 20 thus acts as a band pass filter adapted to receive the incoming RF signals 19 and only the pass filtered signals 21 within a first specific band of frequencies. In one embodiment, the first specific band of frequencies are between about 929 MHz and about 940 MHz. The diplexer 20 also allows one port to be a common connection for incoming forward path signals and outgoing reverse path signals. The diplexers 20 and 42 determine which operating frequency band(s) will be accepted by the repeater 10.

In one embodiment, the forward path 16 also includes a splitter 22 which has a low noise amplifier for amplifying the filtered signals 21. The splitter 22 demultiplexes (separates) the filtered signals 21 into multiple signals. In this embodiment, the gain of the splitter 22 is about 25 dB. In the illustrated embodiment, the multiple signals are three amplified signals 21a, 21b and 21c, as shown in FIG. 2. Each of the multiple is signals has a different frequency. For example, in one embodiment, the filtered signals 21 include three signals at 929.125 MHz, 940.2625 MHz and 940.275 MHz, respectively, that are separated into the three individual amplified signals 21a, 21b and 21c which are also at 929.125 MHz, 940.2625 MHz and 940.275 MHz, respectively.

Figure 3:
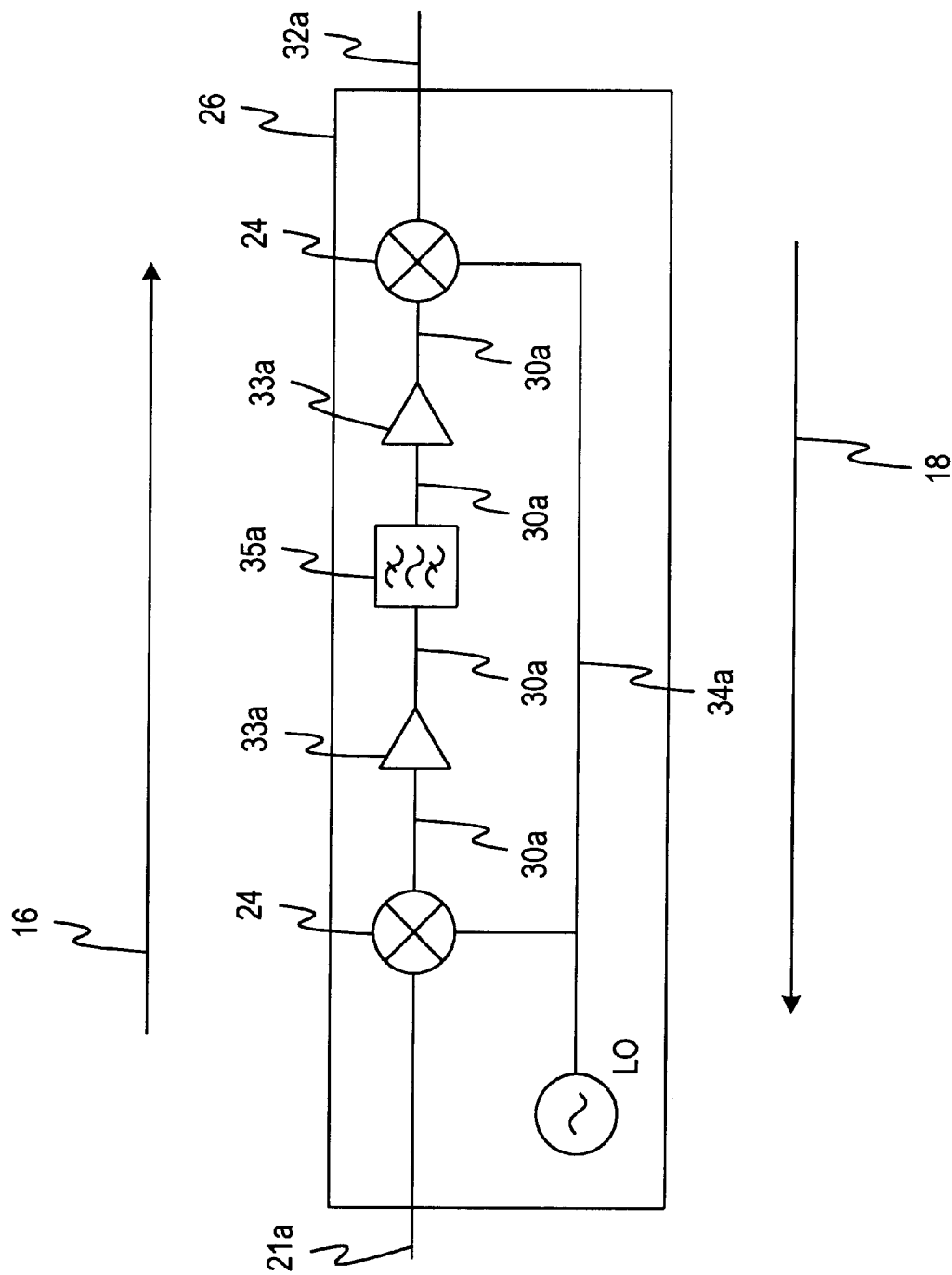
FIG. 3 is a schematic diagram of a channelizer module of the two-way repeater.

A channelizer 25 is included for down converting, processing, and up converting one or more signals. In one embodiment, the channelizer 25 includes a first module 26, a second module 27, and a third module 28 for producing three separate channels, a first channel 32a, a second channel 32b, and a third channel 32c, respectively. Each the three modules 26–28 operate in a similar manner. Therefore, only the module 26 is shown in FIG. 3. The first channelizer module 26 receives the amplified signal 21a. The signal 21a is combined by a mixer 24 with a local oscillator (LO) signal 34a to produce an intermediate frequency (IF) signal 30a. In one embodiment, the RF signal 21a is 929.125 MHz and the LO signal 34a is 974.125 MHz which produces a 45 MHz IF signal 30a. The IF signal 30a is amplified by a pair of amplifiers 33a and filtered by a band pass filter 35a. The gain of each channelizer module 26–28 is adjustable to vary the amplification of each of the separate IF signals 30a–30c. The amplifiers 33a produce between about 20 dB and −20 dB of gain. This allows a user to control the coverage area of the repeater 10.

In one embodiment, the amplifiers used in the repeater 10, such as the amplifiers 33a, comprise relatively low power, linear integrated circuit chip components, such as monolithic microwave integrated circuit (MMIC) chips. These chips may comprise chips made by the Gallium Arsenide (GaAs) heterojunction transistor manufacturing process. However, silicon process chips or CMOS process chips might also be utilized.

Some examples of MMIC power amplifier chips are as follows:

1. RF Microdevices PCS linear power amplifier RF 2125P, RF 2125, RF 2126 or RF 2146, RF Micro Devices, Inc., 7625 Thorndike Road, Greensboro, N.C. 27409, or 7341-D W. Friendly Ave., Greensboro, N.C. 27410;

2. Pacific Monolithics PM 2112 single supply RF IC power amplifier, Pacific Monolithics, Inc., 1308 Moffett Park Drive, Sunnyvale, Calif.;

3. Siemens CGY191, CGY180 or CGY181, GaAs MMIC dual mode power amplifier, Siemens AG, 1301 Avenue of the Americas, New York, N.Y.;

4. Stanford Microdevices SMM-208, SMM-210 or SXT-124, Stanford Microdevices, 522 Almanor Avenue, Sunnyvale, Calif.;

5. Motorola MRFIC1817 or MRFIC1818, Motorola Inc., 505 Barton Springs Road, Austin, Tex.;

6. Hewlett Packard HPMX-3003, Hewlett Packard Inc., 933 East Campbell Road, Richardson, Tex.;

7. Anadigics AWT1922, Anadigics, 35 Technology Drive, Warren, N.J. 07059;

8. SEI Ltd. P0501913H, 1, Taya-cho, Sakae-ku, Yokohama, Japan; and

9. Celeritek CFK2062-P3, CCS1930 or CFK2162-P3, Celeritek, 3236 Scott Blvd., Santa Clara, Calif. 95054.

Furthermore, the channelizer module 26 up converts the IF signal 30a to a radio frequency (RF) signal 32a. To perform this up conversion, the IF signal 30a is combined by another mixer 24 with the local oscillator (LO) signal 34a to produce the RF signal 32a. Therefore, in the illustrated embodiment of FIG. 2, the channelizer 25 produces three separate RF signals 32a–32c. In one embodiment, the RF signals 32a–32c are at the same frequencies as the respective amplified signals 21a–21c.

The forward path 16 further includes a power combiner 36 for multiplexing (combining) the separate RF signals 32a–32c into a combined signal 38 having different frequency components representing the separate RF signals 32a–32c. For example, in one embodiment, the combined signals 38 includes three frequency components at 929.125 MHz, 940.2625 MHz and 940.275 MHz, respectively, which represent the three RF signals 32a, 32b and 32c, respectively. The gain of the combiner 36 is, for example, about 15 dB. A power amplifier 39 is also included in the forward path 16 for amplifying the combined signals 38 into amplified signals 40 suitable for transmission to the pager(s) 14. In one embodiment, the power amplifier 39 is a five watt power amplifier with a gain of about 27 dB.

The output signal 40 of the power amplifier 39 is isolated from the reverse path 18 by the second diplexer 42 which is connected between the output of the forward path 16 and the input of the reverse path 18. The diplexer 42 acts as a band pass filter adapted to only pass outgoing filtered signals 44 within the first specific band of frequencies.

Again, in one embodiment, the first specific band of frequencies are between about 929 MHz and about 940 MHz. The diplexers 20, 42 prevent noise wrap around from the forward path 16 to the reverse path 18, and vice-versa. The filtered signals 44 are sent to the broadcast antenna 12 and transmitted to the two-way pager 14.

The second diplexer 42 is also adapted to receive an incoming pager signal 47 from the pager 14 and only pass a filtered signal 48 that is within the second specific band of frequencies. In one embodiment, the second specific band of frequencies are about 901 MHz (+/−about 3 MHz). Thus, the second diplexer 42 allows one port to be a common connection for outgoing forward path signals and incoming reverse path signals. The diplexers 20 and 42 determine which operating frequency band(s) will be accepted by the repeater 10.

A multistage amplifier 50 is included for amplifying the filtered signal 48 into an amplified pager signal 52. The gain of the multistage amplifier 50 is adjustable to control the coverage area of the repeater. The gain can be adjusted between about 25 dB and 65 dB. In one embodiment, an additional power amplifier 54 is supplied for producing a signal 55 that is suitable for the output of the first diplexer 20. In one embodiment, the additional power amplifier 54 is a 1.6 watt power amplifier with a gain of about 30 dB. The amplified pager signal 52 (or the signal 55) is isolated from the forward path 16 by the first diplexer 20 which is connected between the output of the reverse path 18 and the input of the forward path 16. The diplexer 20 acts as a band pass filter adapted to receive the amplified pager signal 52 (or the signal 55) and only pass an outgoing filtered signal 58 within the second specific band of frequencies. Again, in one embodiment, the second specific band of frequencies are about 901 MHz (+/−about 3 MHz). The diplexers 20, 42 prevent noise wrap around from forward path 16 to the reverse path 18, and vice-versa. The filtered signal 58 is sent to the link antenna 8 and transmitted to the base station antenna 6.

It is to be understood that the BS antenna 6 could be replaced with one or more repeater systems each including a link antenna 8, a two-way repeater 10, and a broadcast antenna 12. In this way, repeater systems can be daisy-chained together to extend the range of an originating base station antenna.

It is also to be understood that the forward path 16 can process one or more signals having different frequencies (channels). Where the channelizer 25 processes multiple channels, one or more of those channels may be used to process a one-way pager signal(s) while one or more of the other channels may be used to process a two-way pager signal(s). One-way pager signals are generally at different frequencies than two-way pager signals.

The repeater 10 also implements a method of transmitting RF signals to and from the pager 14. The method includes down converting the RF signals 19 from a base station antenna to intermediate frequency (IF) signals 30a–c, amplifying the IF signals 30a–c and up converting the IF signals 30a–c to RF signals 32a–c which are combined and transmitted to the pager 14. For the reverse path 18, the method includes receiving the pager signal 47 from the pager 14, filtering and amplifying the pager signal 47 to produce the amplified pager signal 52 (or the signal 55) which is filtered and transmitted to the base station antenna 6.

Therefore, the present invention provides an inexpensive option for filling nulls and/or extending the coverage area of a two-way pager system by providing a two-way pager repeater that is capable of transmitting and receiving pager signals between a base station antenna (or another two-way repeater) and a pager.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of transmitting radio frequency (RF) signals to and from a pager, the method comprising:
   down converting a first RF signal to an intermediate frequency (IF) signal;
   amplifying the IF signal;
   up converting the IF signal to a second RF signal;
   transmitting the second RF signal to a pager;
   receiving a pager signal from a pager in response to the second RF signal; and
   transmitting the pager signal to an antenna directly as an RF signal without conversion to an IF signal.

2. The method of claim 1, further including splitting the first RF signal into multiple signals having different frequencies.

3. The method of claim 1, further including amplifying the first RF signal and separating the first RF signal into multiple individual channels.

4. The method of claim 1, further comprising amplifying the pager signal.

5. The method of claim 4, further comprising varying the amplification of the pager signal to allow the coverage area of the repeater to be controlled.

6. The method of claim 1, further including filtering the bandwidth of the first RF signal.

7. The method of claim 1, further including varying the amplification of the IF signal to allow the coverage area of the repeater to be controlled.

8. The method of claim 1, wherein the RF signals are at between about 901 MHz and about 940 MHz.

9. The method of claim 1, wherein the amplifying of the IF signal includes varying gain by as much as about 40 dB.

10. A repeater for transmitting and receiving radio frequency (RF) signals to and from a pager, the repeater comprising:
   a forward path for receiving first RF signals, the forward path including a splitter for demultiplexing the first RF signals into separate signals having different frequencies, a channelizer coupled to the splitter for down converting the separate signals to intermediate frequency (IF) signals, wherein the channelizer is further configured to amplify and up convert the IF signals to second RF signals suitable for transmission to the pager; and
   a reverse path for receiving RF pager signals from the pager; the reverse path including an amplifier for amplifying the pager signal for direct transmission to an antenna as RF pager signals without intermediate conversion to IF signals.

11. The repeater of claim 10, wherein the channelizer has an adjustable gain for controlling the coverage area of the repeater.

12. The repeater of claim 10, wherein the amplifier has an adjustable gain for controlling the coverage area of the repeater.

13. The repeater of claim 10, wherein the splitter amplifies the first RF signal and separates the first RF signal into multiple individual channels.

14. The repeater of claim 13, wherein the channelizer is adapted to process the multiple individual channels.

15. The repeater of claim 10, further including at least one diplexer adapted to isolate the forward path RF signals from the amplified signal RF pager signals.

16. The repeater of claim 10, wherein the splitter is configured to receive RF signals having a frequency between about 901 MHz and about 940 MHz.

17. The repeater of claim 10, further including an additional power amplifier coupled to the splitter.

18. The repeater of claim 10, wherein gain of the channelizer is variable by as much as about 40 dB.

19. The repeater of claim 10, wherein the splitter has about 25 dB of gain.

20. The repeater of claim 10, further including a combiner having about 15 dB of gain.

21. The repeater of claim 10, further including a power amplifier coupled to the channelizer.

22. The repeater of claim 10, further including a link antenna and a broadcast antenna.

23. The repeater of claim 10, wherein the channelizer is further configured to process both a one-way pager signal and a two-way pager signal.

24. A repeater for use in a paging system to fill nulls in a pager system coverage area, the repeater being capable of two-way communication with a pager, the repeater comprising:

a forward path including a first diplexer having an input port adapted to pass first radio frequency (RF) signals within a first specific band of frequencies, a splitter for amplifying and demultiplexing the first RF signals into separate signals having different frequencies, a channelizer for down converting the separate signals to respective intermediate frequency (IF) signals, the gain of the channelizer being adjustable to vary the amplification of the IF signals to control the coverage area of the repeater, the channelizer further including an amplifier for amplifying the IF signals to control the coverage area of the repeater and an up converter for up converting the IF signals to respective second RF signals, a power combiner for combining the second RF signals into a combined signal having different frequency components representing the second RF signals, a power amplifier for amplifying the combined signal for transmission to the pager, and a second diplexer having an output port adapted to only pass filtered signals that are within the first specific band of frequencies; and a reverse path including at least the second diplexer with an input port of the second diplexer adapted to pass a pager signal from a pager that is within a second specific band of frequencies, the reverse path configured for transmission of the pager signal directly as an RF signal without intermediate conversion to an IF signal and comprising a multistage amplifier for amplifying the pager signal for transmission to a base station antenna directly as an amplified RF signal, the gain of the multistage amplifier being adjustable to control the coverage area of the repeater, and the first diplexer with an output port adapted to only pass filtered signals that are within the second specific band of frequencies.

25. The repeater of claim 24, wherein the channelizer is adapted to process multiple individual channels.

26. The repeater of claim 24, wherein the RF signals are between about 901 MHz and about 940 MHz.

27. The repeater of claim 24, further including a link antenna and a broadcast antenna.

28. A repeater for transmitting and receiving radio frequency (RF) signals to and from a pager, the repeater comprising:

a forward path for receiving a first RF signal, the forward path including a down converter for down converting the first RF signal to an intermediate frequency (IF) signal, an amplifier coupled to the down converter for amplifying the IF signal, and an up converter coupled to the amplifier for up converting the IF signal to a second RF signal suitable for transmission to the pager; and a reverse path for receiving a pager signal from the pager, the reverse path including a second amplifier for amplifying a signal from the pager for transmission to a base station antenna, the reverse path configured for transmission of the pager signal directly as an RF signal without intermediate conversion to an IF signal.

29. The repeater of claim 28, wherein the amplifier has an adjustable gain for controlling the coverage area of the repeater.

30. The repeater of claim 28, wherein the second amplifier has an adjustable gain for controlling the coverage area of the repeater.

31. The repeater of claim 28, further including a power amplifier coupled to the up converter.

32. The repeater of claim 28, further including a link antenna and a broadcast antenna.

33. A repeater for pagers comprising:

a channelizer circuit configured to receive pager signals from the base station and configured to down convert the pager signals to intermediate frequency (IF) signals and further configured to amplify and up convert the IF signals to RF signals suitable for transmission to at least one pager;

the repeater further including an amplifier configured to amplify the pager signal for transmission directly without conversion to an IF signal.

* * * * *